(12) United States Patent
Kim

(10) Patent No.: US 6,908,037 B2
(45) Date of Patent: *Jun. 21, 2005

(54) CIRCUIT FOR GENERATING CLOCK SIGNAL AND DECODING DATA SIGNAL FOR USE IN CONTACTLESS INTEGRATED CIRCUIT CARD

(75) Inventor: Ki-Yeol Kim, Gunpo-shi (KR)

(73) Assignee: Samsung Electronics, Co., Ltd. (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 10/672,255

(22) Filed: Sep. 26, 2003

(65) Prior Publication Data

US 2004/0076251 A1 Apr. 22, 2004

Related U.S. Application Data

(63) Continuation-in-part of application No. 10/465,062, filed on Jun. 19, 2003.

(30) Foreign Application Priority Data

Sep. 26, 2002 (KR) ............................................. 02-58393
Aug. 12, 2003 (KR) ................................. 10-2003-0055811

(51) Int. Cl.[7] ............................................. G06K 19/06
(52) U.S. Cl. ........................ 235/492; 235/441; 235/451
(58) Field of Search ................................ 235/492, 441, 235/451; 340/3.2, 3.55

(56) References Cited

U.S. PATENT DOCUMENTS

| | | |
|---|---|---|
| 3,689,885 A | 9/1972 | Kaplan et al. ............ 340/152 T |
| 3,991,265 A | 11/1976 | Fukuda et al. ................ 178/5.6 |
| 4,206,323 A | 6/1980 | Padgett et al. .................. 179/84 |

(Continued)

FOREIGN PATENT DOCUMENTS

JP         405307369 A       11/1993       ............ G09G/3/36

OTHER PUBLICATIONS

International Standards Organization, ISO/IEC JTC 1/SC 17, "Identification cards–Contactless integrated circuit card(s)—Proximity cards–Part 1: Physical characteristics," Oct. 20, 1999, pp. 1–5.

International Standards Organization, ISO/IEC JTC 1/SC 17, "Identification cards–Contactless integrated circuit card(s)—Proximity cards–Part 2: Radio frequency power and signal interface," Jul. 13, 2000, pp. 1–11.

(Continued)

*Primary Examiner*—Michael G. Lee
*Assistant Examiner*—Uyen-Chau N. Le
(74) *Attorney, Agent, or Firm*—Mills & Onello LLP

(57) ABSTRACT

An integrated circuit card includes a circuit for generating a clock signal and restoring data. The circuit includes a receiver for receiving a radio frequency signal having a pause period; a divider for dividing the received signal; a first counter for counting a period of the divided signal at each non-pause period of the received signal; a second counter for counting a period of the divided signal; and a decoder for generating a synchronous clock signal and a decoded data signal in response to outputs of the first and second counters. The circuit can generate a synchronous clock signal and decode a received data signal so as to be compatible with ISO/IEC 14443 Type A protocol, based on the received radio frequency signal transferred from a card reader. The circuit provides an exact decoding result even when the pause period of the received radio frequency varies over a predetermined range.

29 Claims, 8 Drawing Sheets

U.S. PATENT DOCUMENTS

| | | | | |
|---|---|---|---|---|
| 4,377,804 A | * | 3/1983 | Suzuki | 340/310.02 |
| 4,532,635 A | | 7/1985 | Mangulis | 375/1 |
| 4,617,674 A | * | 10/1986 | Mangulis et al. | 375/141 |
| 4,729,024 A | * | 3/1988 | Kawai et al. | 348/540 |
| 4,733,353 A | * | 3/1988 | Jaswa | 713/375 |
| 4,897,723 A | * | 1/1990 | Arai | 348/548 |
| 5,293,399 A | | 3/1994 | Hefti | 375/7 |
| 5,360,967 A | | 11/1994 | Perkin et al. | 235/375 |
| 5,457,461 A | | 10/1995 | Schuermann | 342/42 |
| 5,548,291 A | | 8/1996 | Meier et al. | 342/51 |
| 6,036,100 A | * | 3/2000 | Asami | 235/492 |
| 6,362,738 B1 | | 3/2002 | Vega | 340/572.1 |
| 6,585,166 B1 | * | 7/2003 | Ookawa et al. | 235/492 |
| 6,617,172 B2 | | 9/2003 | Usami | 438/2 |

OTHER PUBLICATIONS

International Standards Organization, ISO/IEC JTC 1/SC 17, "Identification cards–Contactless integrated circuit cards(s)—Proximity cards–Part 3: Initialization and anticollision," Jul. 13, 2000, pp. 1–48.

* cited by examiner

ASK 100%
Modified Miller, 106kbit/s

Load Modulation
Subcarrier f/16
OOK
Manchester,106kbit/s

Fig. 3A

| S | b1 | b2 | b3 | b4 | b5 | b6 | b7 | E |
|---|----|----|----|----|----|----|----|---|
|   | LSB |   |   |   |   |   | MSB |   |

Fig. 3B

| S | b1 b2 b3 b4 b5 b6 b7 b8 | P | b1 b2 | b7 b8 | P | b1 b2 | b8 | P | E |

CIRCUIT FOR GENERATING CLOCK SIGNAL AND DECODING DATA SIGNAL FOR USE IN CONTACTLESS INTEGRATED CIRCUIT CARD

RELATED APPLICATIONS

This application is a continuation-in-part application of U.S. Ser. No. 10/465,062, filed Jun. 19, 2003, the contents of which are incorporated herein by reference.

FIELD OF THE INVENTION

The present invention is directed to a contactless integrated circuit (IC)card, and in particular to a circuit for generating a clock signal from a received radio frequency signal and for restoring data in the contactless IC card.

BACKGROUND OF THE INVENTION

Since the advent of the credit card in the 1920's, a number of electronic information cards have evolved such as debit (or cash) cards, credit cards, identification cards, department store cards, and the like. Recently, integrated circuit (IC) cards, named as such since a minicomputer is integrated into the cards, have become popular for their convenience, stability and numerous applications.

In general, IC cards are of a shape such that a thin semiconductor device is attached to a plastic card of the same size as a credit card. As compared to a conventional credit card, including a magnetic media strip, IC cards enjoy various benefits such as high stability, write-protected data, and high security. For this reason, IC cards have become widely accepted as the multimedia information media of the next generation.

IC cards can be roughly classified as a contact IC card, a Contactless IC Card (CICC), and a Remote Coupling Communication Card (RCCC). In connection with the CICC, ISO (the International Organization for Standardization) and IEC (the International Electrotechnical Commission) have formed a specialized system for worldwide standardization. Particularly international standard ISO/IEC 14443 specifies the physical characteristics of proximity cards, radio frequency power and signal interface, initialization and anticollision, and transmission protocol. Under ISO/IEC 14443, the contactless IC cards incorporate an integrated circuit (IC) that performs data processing and/or memory functionality. The possibility of contactless card technology is a result of the achievement of signal exchange via inductive coupling with a proximity coupling device (that is, a card reader) and to ability to supply power to the card without the use of galvanic elements (i.e., the absence of an ohmic path from the external interfacing equipment to the integrated circuit(s) contained within the card). A card reader produces an energizing radio frequency (RF) field which is coupled to the card in order to transfer power and which is modulated for communication. The frequency fc of the RF operating field is 13.56MHz±7kHZ.

FIGS. 1A and 1B illustrate concepts of communication signals for Type A and Type B interfaces of the ISO/IEC 14443. The communication signal of FIG. 1A is transferred from a card reader to a contactless IC card, and the communication signal of FIG. 1B is transferred from the contactless IC card to the card reader. The ISO/IEC 14443 protocol describes two communication signal interfaces, Type A and Type B. Under the communication signal interface Type A, communication from a card reader to a contactless IC card utilizes the modulation principle of ASK 100% of the RF operating field and a Modified Miller code principle. The bit rate for the transmission from the card reader to the contactless IC card is fc/128, that is, 106 kbps (kbit/s). Transmission from the contactless IC card to the card reader is coded by the Manchester code principle and then modulated by the On-Off Key (OOK) principle. Presently, cards that are managed by the communication signal interface of Type A in subways and buses of Seoul, Korea, generate timing of a constant interval of time using an ASK-modulated signal received from a card reader, and receive and transmit data one bit at a time.

When data is transferred from an IC card to a card reader, power is stably provided to the IC card from the card reader. However, when data is transferred to the IC card from the card reader, a pause period t2 as shown in FIG. 2 is created. Namely, power to the card reader from the IC card is interrupted during the pause period t2. At that time, a clock signal generated in an RF receiver has a discontinuous waveform. Under these conditions, it is difficult to maintain the specified bit rate of 106 kps for the ISO/IEC 14443 Type A protocol, because a synchronous clock signal for transmission and receipt is generated by dividing such a clock signal having a discontinuous period.

FIGS. 3A and 3B show data frames of ISO/IEC 14443 Type A data. FIG. 3A illustrates a short frame that is used to initiate communication and consists of a start signal for communication S, 7 data bits transmitted in an LSB-first orientation b1–b7, and an end signal for communication E in this order. FIG. 3B illustrates standard frames that are used for data exchange and consist of a start of communication S, 8 data bit+odd parity bits b1–b7 and P, and an end of communication E. The LSB of each byte is transmitted first. Each byte is followed by an odd parity bit P. The parity bit P is set such that the number of 1s is odd (b1 to b8 and P).

A conventional decoding circuit in a contactless IC card extracts respective bits from an RF signal received in synchronization with a synchronous clock signal, separates the extracted bits into a start bit S, data bits b1–b7 and an end bit E, and detects received data from the separated bit information. A synchronous clock signal having no discontinuous period (that is, a pause period) is required in order to enable the decoding circuit to operate normally.

There is thus a need for generating a synchronous clock signal of a constant frequency from a radio frequency signal having a discontinuous or pause period t2 as shown in FIG. 2 for contactless IC card technology.

SUMMARY OF THE INVENTION

It is therefore an object of the invention to provide a circuit capable of producing a synchronous clock signal of a constant frequency from a received RF signal without a pause period in a contactless integrated circuit card.

It is another object of the invention to provide a circuit capable of precise restoration of data from a received RF signal in a contactless integrated circuit card.

In a first aspect, the present invention is directed to a device for generating a clock signal and decoding data for use in a contactless integrated circuit device. The device comprises: a receiver for receiving a radio frequency (RF) signal having a pause period; a divider for dividing the received RF signal to provide a divided signal; a first counter for counting a period of the divided signal at each non-pause period of the received RF signal; a second counter for counting a period of the divided signal; and a decoder for generating a synchronous clock signal and a decoded data signal in response to outputs of the first and second counters.

In one embodiment, the first counter is reset during the pause period of the RF signal. The second counter is reset at a falling edge of the synchronous clock signal.

The RF signal is, for example, based on an ISO-14443 Type A interface.

The decoder may further generate a signal indicating an end of a received frame in response to the outputs of the first and second counters.

In another aspect, the present invention is directed to a data restoring device for use in a contactless integrated circuit card. The device comprises: a receiver for receiving an RF signal having a pause period and extracting data and clock signals from the received RF signal; a divider for dividing the clock signal to generate a divided clock signal; a first counter for counting a period of the divided clock signal at each non-pause period of the data signal; a second counter for counting a period of the divided clock signal; and a decoder for generating a synchronous clock signal and a decoded data signal in response to outputs of the first and second counters.

The first counter may be reset at a start of the pause period of the data signal. In one embodiment, the first counter is a 3-bit counter. Preferably, the second counter, for example, a 2-bit counter, is reset at a falling edge of the synchronous clock signal. The output of the second counter sequentially varies between '0' and '2'.

In another embodiment, the first counter is a 4-bit counter. The second counter may be reset in response to a combination of the outputs of the first and second counters. In this case, the second counter may be a 3-bit counter.

Preferably, the decoder further generates a signal indicating an end of a received frame in response to the outputs of the first and second counters.

Preferably, the device further comprises an OR gate for receiving a reset signal for resetting the card and the data signal, wherein the first counter is reset by an output of the OR gate.

The divider may include: a plurality of division units connected in series between an input terminal and an output terminal, wherein the input terminal receives the clock signal from the receiver and each division unit divides an input signal by N (N is an integer); and a selector for selecting one of outputs of the division units in response to an external selection signal, as the divided clock signal.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 3A and 3B are diagrams showing data frames for ISO/IEC 14443 Type A protocol;

DETAILED DESCRIPTION OF PREFERRED EMBODIMENTS

The preferred embodiment of the invention will be more fully described with reference to the attached drawings.

Figure 4:
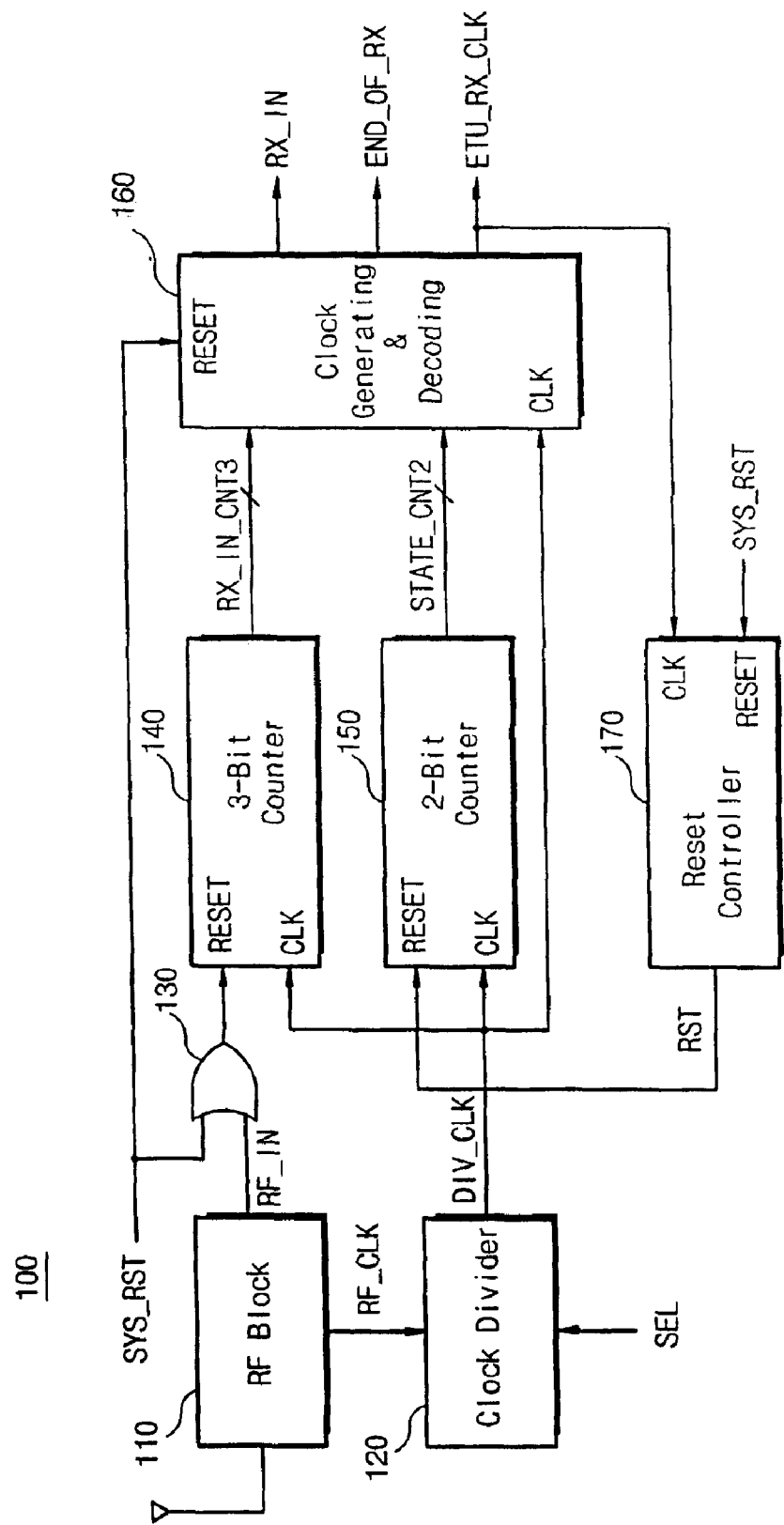
FIG. 4 is a block diagram of a clock generating and data restoring circuit of a contactless integrated circuit card according to the present invention.

FIG. 4 is a block diagram of a clock generating and data restoring circuit of a contactless integrated circuit card according to the present invention. Referring to FIG. 4, a clock generating and data restoring circuit is incorporated into a contactless IC card and includes an RF block 110, a clock divider 120, an OR gate 130, a 3-bit counter 140, a 2-bit counter 150, a clock generator and decoder block 160, and a reset controller 170.

The RF block 110 receives an RF signal, for example having a frequency of 13.56MHz and a bit rate of 106 kbps based on an ISO/IEC 14443 Type A protocol, and converts the received signal into a clock signal RF_CLK and a data signal RF_IN that are appropriate for a digital circuit. The clock divider 120 divides the clock signal RF_CLK from the block 110 to generate a divided clock signal DIV_CLK. As will be described hereinafter, the clock divider 120 generates various frequencies of clock signals and outputs one of the clock signals in response to a selection signal SEL. Gate 130 receives a system reset signal SYS_RST and the data signal RF_IN from the block 110.

Continuing to refer to FIG. 4, the 3-bit counter 140 is reset by an output of the gate 130 and counts the period of the divided clock signal DIV_CLK from the clock divider 120. The output RX_IN_CNT3 of the 3-bit counter 140 sequentially varies from '0' to '7' (in a binary number, from '000' to '111'). The 2-bit counter 150 is reset by a reset signal RST generated from the reset controller 170 and counts the period of the divided clock signal DIV_CLK from the clock divider 120. The output STATE_CNT2 of the 2-bit counter 150 sequentially varies from '0' to '2' (in a binary number, from '00' to '10').

The clock generator and decoder block 160 operates in response to the outputs RX_IN_CNT3 and STATE_CNT2 from the counters 140 and 150, and generates a synchronous clock signal ETU_RX_CLK, a decoded data signal RX_IN, and a frame end signal END_OF_RX. The reset controller 170 is reset by the system reset signal SYS_RST and generates the reset signal RST in response to the synchronous clock signal ETU_RX_CLK.

Figure 5:
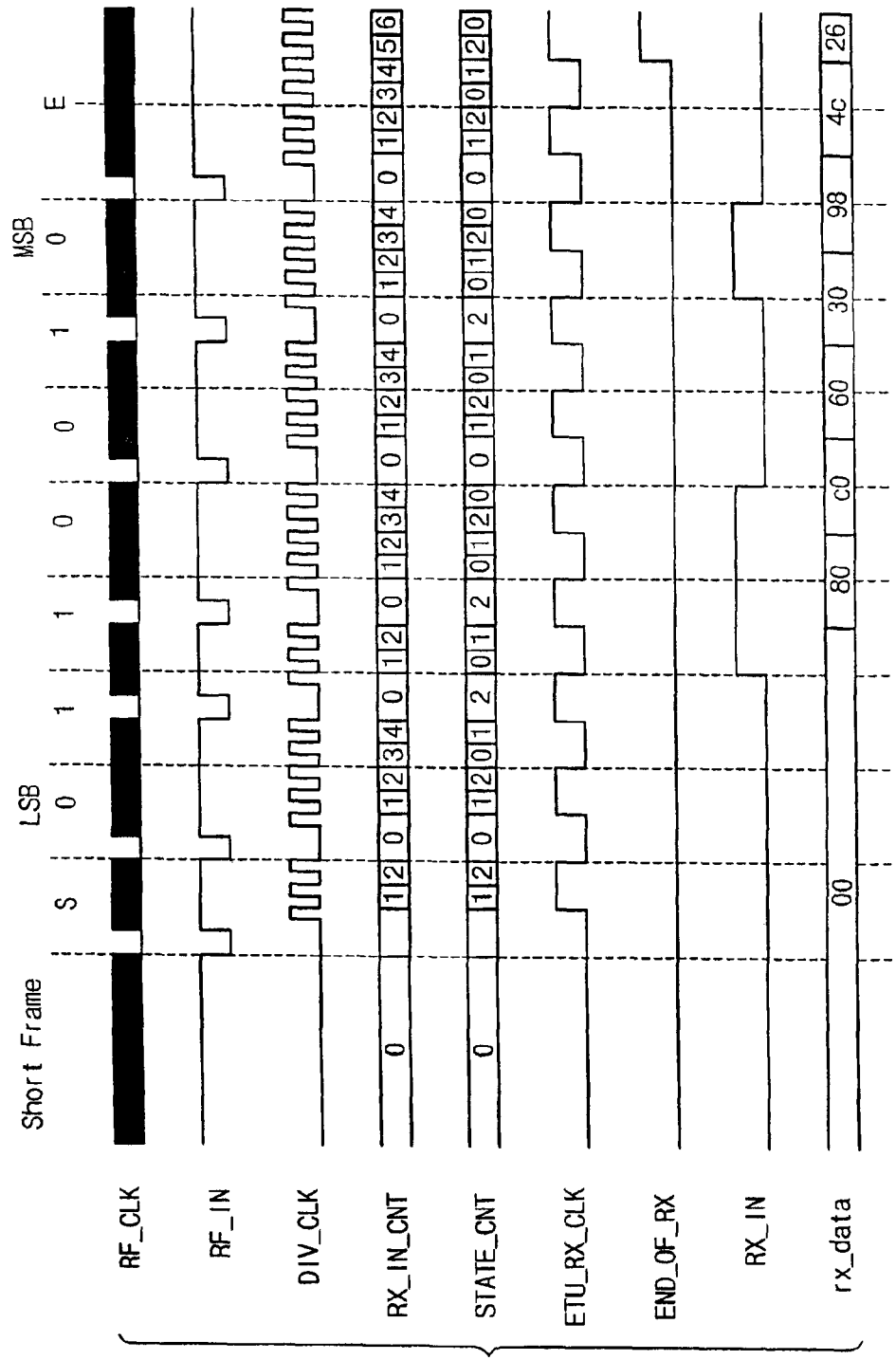
FIG. 5 is a timing diagram of the operation of various signals of the circuit of FIG. 4.

FIG. 5 is a timing diagram illustrating the response and operation of various signals of the circuit of FIG. 4, in the case where a short frame is used to initiate communication. The operation of a clock generating and data restoring circuit will now be fully described below with reference to FIGS. 4 and 5.

Referring to FIGS. 4 and 5, before a short frame is received from a card reader (not shown), the 3-bit counter 140 and the reset controller 170 are reset by a system reset signal SYS_RST. At this time, a 2-bit counter 150 is reset by a reset signal RST from the reset controller 170. When reset, output values RX_IN_CNT3 and STATE_CNT2 from the counters 140 and 150 become '0'. As illustrated in FIG. 5, before the short frame is received, the RF block 110 outputs a data signal RF_IN at a high level.

When a start bit S being a first bit of the short frame is received, the data signal RF_IN from the RF block 110 transitions from a high level (logic '1') to a low level (logic '0'). At this time, the clock divider 120 begins to divide the clock signal RF_CLK. Assuming that a period of each bit of a short frame illustrated in FIG. 3A is an ETU (Elementary Time Unit), in this embodiment, the divided clock signal DIV_CLK output by the clock divider 120 has a period of $$\frac{ETU}{4}.$$

After reset, the counters 140 and 150 perform a count operation in response to the falling edge of the divided clock signal DIV_CLK. The clock generator and decoder block 160 generates rising and falling edges of a synchronous clock signal ETU_RX_CLK when the outputs RX_IN_CNT3 and STATE_CNT of the counters 140 and 150 have specified values.

The following table shows the conditions under which the synchronous clock signal ETU_RX_CLK is generated in response to the outputs RX_IN_CNT2 and STATE_CNT3 of the counters 140 and 150.

TABLE 1

| ETU_RX_CLK | RX_IN_CNT3 [0] | STATE_CNT2 [0] |
|---|---|---|
| Rising Clock | 0 | 0 |
|  | 0 | 1 |
|  | 1 | 1 |
|  | 2 | 1 |
|  | 4 | 1 |
|  | 5 | 1 |
|  | 6 | 1 |
| Falling Clock | 0 | 2 |
|  | 2 | 0 |
|  | 2 | 2 |
|  | 3 | 0 |
|  | 4 | 0 |
|  | 6 | 0 |
|  | 7 | 0 |

For example, when the output RX_IN_CNT3 of the 3-bit counter 140 is 1 and the output STATE_CNT2 of the 2-bit counter 150 is 1, a rising edge of the synchronous clock signal ETU_RX_CLK is established. When the output RX_IN_CNT3 of the 3-bit counter 140 is 2 and the output STATE_CNT2 of the 2-bit counter 150 is 2, a falling edge of the synchronous clock signal ETU_RX_CLK is established.

The reset controller 170 of FIG. 4 activates a reset signal RST in response to a falling edge of the synchronous clock signal ETU_RX_CLK from the clock generator and decoder block 160. The 2-bit counter 150 is reset by activation of the reset signal RST. The 3-bit counter 140 is reset when a data signal RF_IN from the RF block 110 transitions from a high level to a low level. As the above operations are repeated, the synchronous clock signal ETU_RX_CLK of a frequency 0.11 MHz is produced.

Meanwhile, the clock generator and decoder block 160 generates a decoded data signal RX_IN in response to the outputs RX_IN_CNT3 and STATE_CNT2 of the counters 140 and 150.

The following table shows the conditions under which the decoded data signal RX_IN is generated in response to the outputs RX_IN_CNT3 and STATE_CNT2 of the counters 140 and 150.

TABLE 2

| RX_IN | RX_IN_CNT3 | STATE_CNT2 | RF_IN |
|---|---|---|---|
| LOGIC 0 | 2 | 2 | 0111 |
|  | 4 | 0 | 1111 |
|  | 5 | 2 |  |
|  | 7 | 2 |  |
| LOGIC 1 | 0 | 2 | 1101 |
|  | 3 | 0 |  |
|  | 7 | 0 |  |

The data signal RF_IN is the modified miller code, and indicates logic '0' when its value is '0111' or '1111' during one ETU and indicates logic '1' when its value is '1101'. For example, when an output RX_IN_CNT3 of the counter 140 is '0' and an output STATE_CNT2 of the counter 150 is '2', the block 160 outputs a decoded data signal RX_IN at a high level. When the output RX_IN_CNT3 of the counter 140 is '4' and the output STATE_CNT2 of the counter 150 is '0', the block 160 outputs a decoded data signal RX_IN at a low level. According to this condition, received data RF_IN "1111011101111101" is converted into decoded data RX_IN "0001".

A method for detecting an end bit E indicating the end of one frame is as follows. The block 160 generates a frame end signal END_OF_RX in response to output signals RX_IN_CNT3 and STATE_CNT2 from the counters 140 and 150. The following table shows the conditions under which the frame end signal END_OF_RX is generated in response to the values of output signals RX_IN_CNT3 and STATE_CNT2 of the counters 140 and 150.

TABLE 3

| RX_IN | RX_IN_CNT3 | STATE_CNT2 |
|---|---|---|
| END_OF_RX | 6 | 0 |
|  | 7 | 0 |

As is understood from the table 3, when the output value RX_IN_CNT3 of the 3-bit counter 140 is 6 or 7 and the output value STATE_CNT2 of the 2-bit counter 150 is 0, the clock generator and decoder 160 activates the frame end signal END_OF_RX at a high level.

In this manner, the present invention is capable of receiving data appropriate to ISO/IEC 14443 Type A protocol by generating a synchronous clock signal ETU_RX_CLK of 0.11 MHz and a decoded data signal RX_IN.

Figure 6:
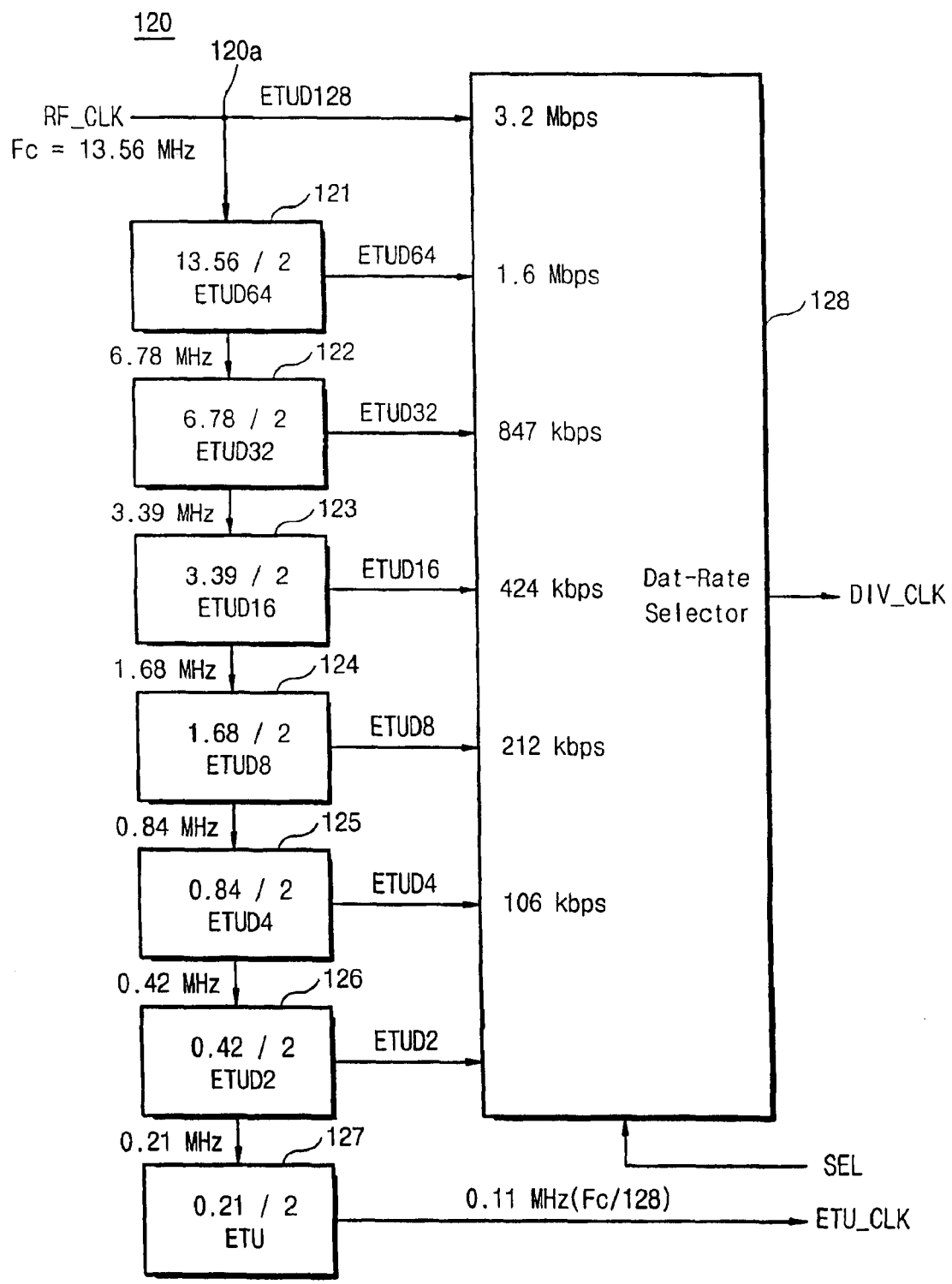
FIG. 6 is a preferred embodiment of the clock divider of FIG. 4.

Although the present invention is described using a bit rate of 106 kbps, the present invention can support various bit rates. FIG. 6 is an exemplary embodiment of the clock divider 120 of FIG. 4. Referring to FIG. 4, a clock divider 120 includes a plurality of dividers (or division units) 121–127 and a bit-rate selector 128. The dividers 121–127 are connected in series between an input terminal 120a and an output terminal 120b. Each of the dividers 121–127 divides the frequency of a received signal by 2. The bit-rate selector 128 selects one of divided clock signals ETUD2–ETUD64 from the dividers 121–127, as an output DIV_CLK.

According to the ISO/IEC 14443 standard, the clock signal RF_CLK has a frequency of 13.56 MHz. In order to support a bit rate of 106 kbps, a clock signal ETUD4 from the divider 125 is used as a clock signal DIV_CLK that is supplied to 2-bit and 3-bit counters 140 and 150 and a clock generator and decoder block 160. For example, in order to support a bit rate of 212 kbps, a clock signal ETUD8 from the divider 124 is used as the clock signal DIV_CLK that is supplied to the 2-bit and 3-bit counters 140 and 150 and the clock generator and decoder block 160. Thus, the clock generating and data restoring circuit according to the present invention can support a bit rate of 3.2 Mbps.

Figure 1A:
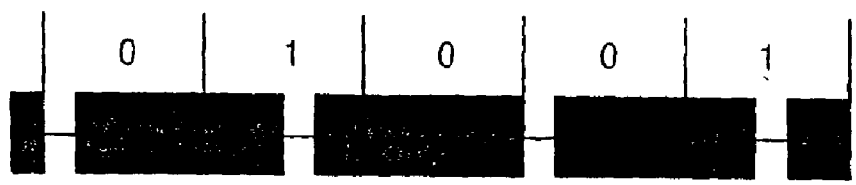
FIGS. 1A and 1B are diagrams showing communication signals for Type A and Type B interfaces under the ISO/IEC 14443 protocol.
Figure 1B:
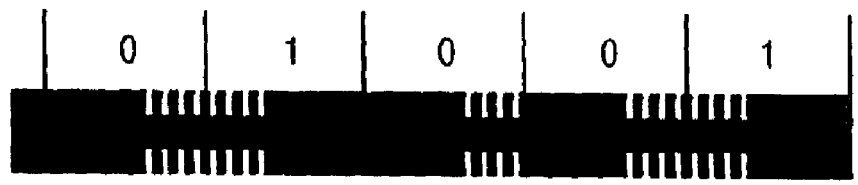
Figure 2:
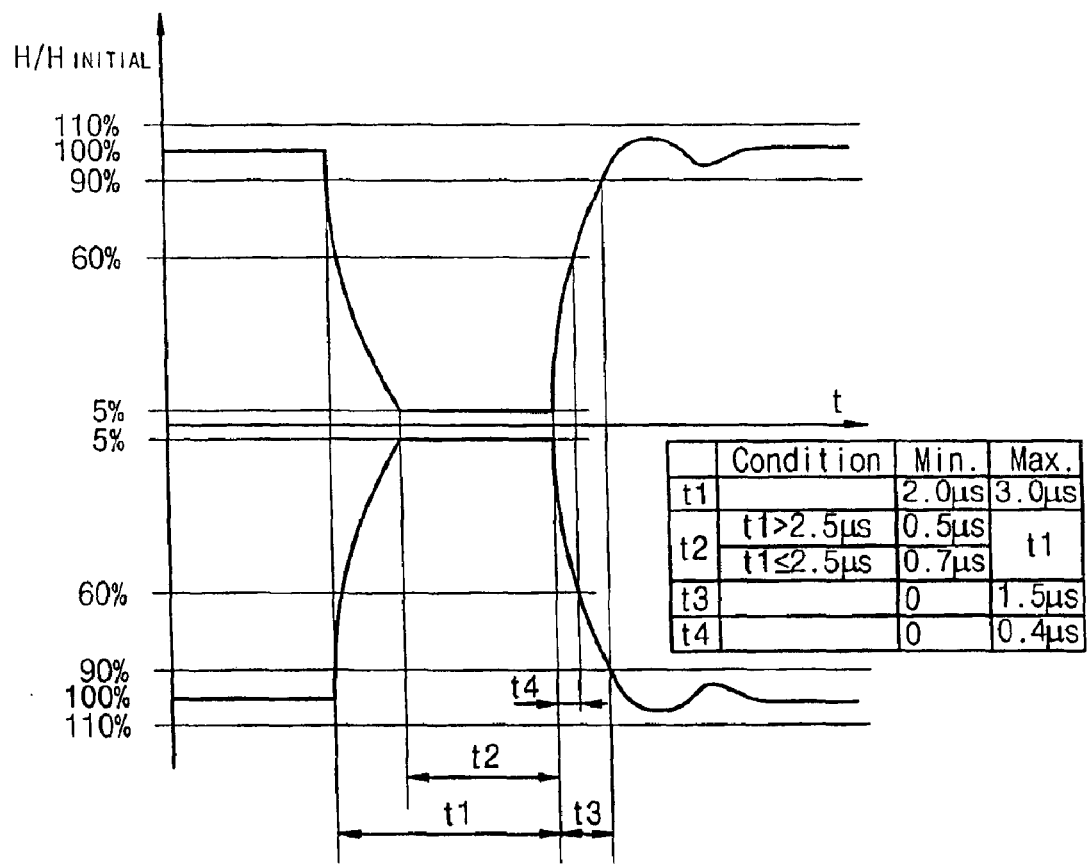
FIG. 2 is a waveform diagram showing a signal transferred from a card reader to an integrated circuit card.

As explained before, the duty of the pause period of an RF signal transmitted from a card reader to an IC card varies as the IC card approaches the card reader (terminal). Such a pause period is variable in accordance with the distance between the card reader and the IC card, impedance matching with an antenna, or the strength of the RF signal. The clock generating and data restoring circuit of the contactless IC card shown in FIG. 4 operates in a normal condition only when the duty of the pause period is set to a specific value in the range of Min~Max as shown in FIG. 2. Thus, when the duty of the pause period varies outside the range of Min~Max the circuit 100 would not restore exact codes. The reason for this is because the counter 150 is operable in 2-bit counting that limits resolution to 25% per unit period.

Figure 7:
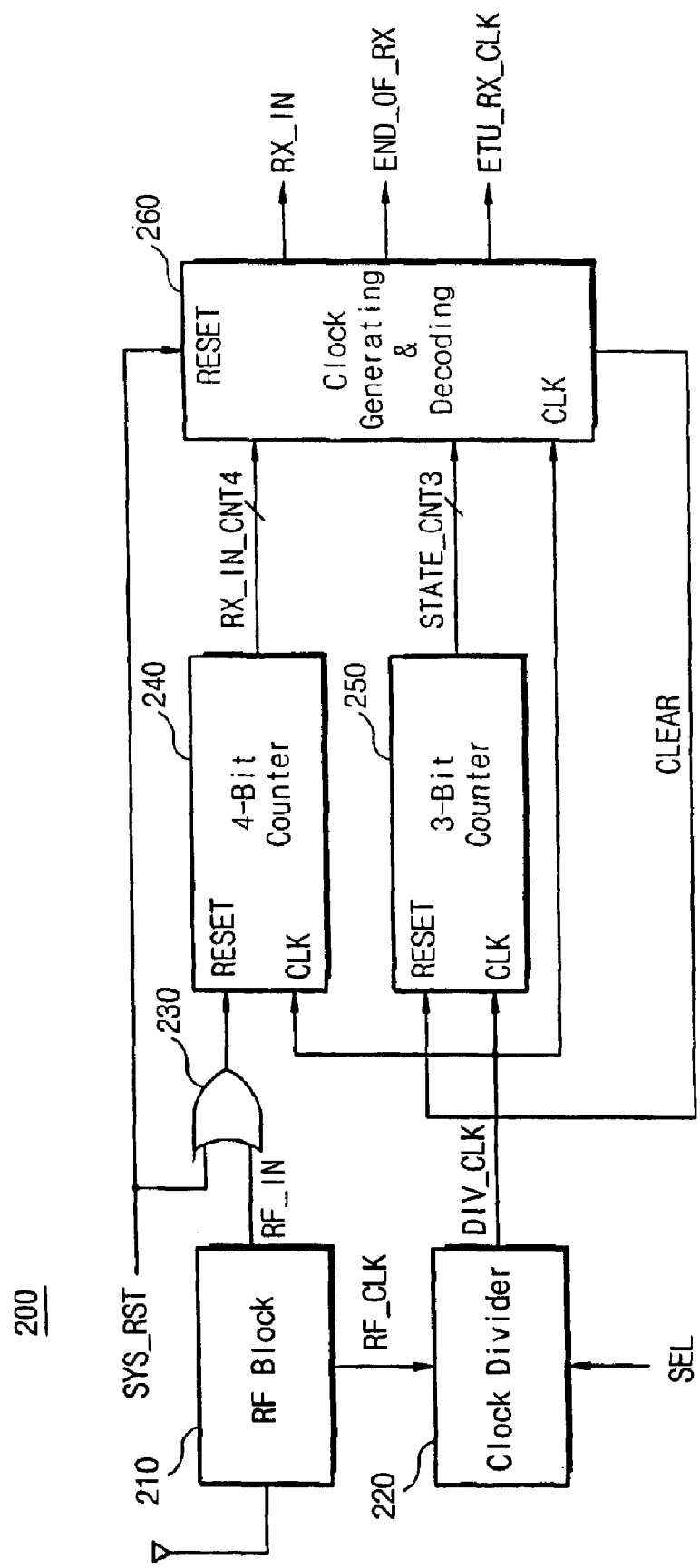
FIG. 7 is a block diagram of a clock generating and data restoring circuit of a contactless integrated circuit card according to another embodiment of the present invention, capable of restoring exact codes even with large duty variation during a pause period.

FIG. 7 illustrates a functional construction of a clock generating and code restoring circuit of a contactless IC card, according to another embodiment.

Referring to FIG. 7, a clock generating and data restoring circuit 200 is similar in configuration to the circuit 100 shown in FIG. 4. However, this embodiment, counter 240 is a 4-bit counter, while counter 250 is a 3-bit counter. In addition, the signal CLEAR for resetting the counter 250 is provided by the clock generating and decoding circuit 260.

The 4-bit counter 240 is synchronized with rising and falling edges of the clock signal DIV_CLK, which is generated by the clock divider 220 when the data signal RF_IN is a high level, and generates an output RX_IN_CNT4. The 4-bit counter 240 is reset when the data signal RF_IN is at a low level. The output RX_IN_CNT4 of the 4-bit counter 240 changes from '0000' to '1111' (from 0 to 15) sequentially. The 3-bit counter 250 is reset in response to a clear signal CLEAR provided by the clock generating and decoding circuit 260. The 3-bit counter 250 is synchronized with rising and falling edges of the clock signal DIV_CLK, and generates an output STATE_CNT3. The output STATE_CNT4 from the 3-bit counter 250 changes from '000' to '111' (from 0 to 7) sequentially.

The clock generating and decoding circuit 260 generates a synchronous clock signal ETU_RX_CLK in response to the input RX_IN_CNT4 and STATE_CNT3 signals, and generates the decoded data signal RA_IN, a frame termination signal END_OF_RX, and the clear signal CLEAR.

Figure 8:
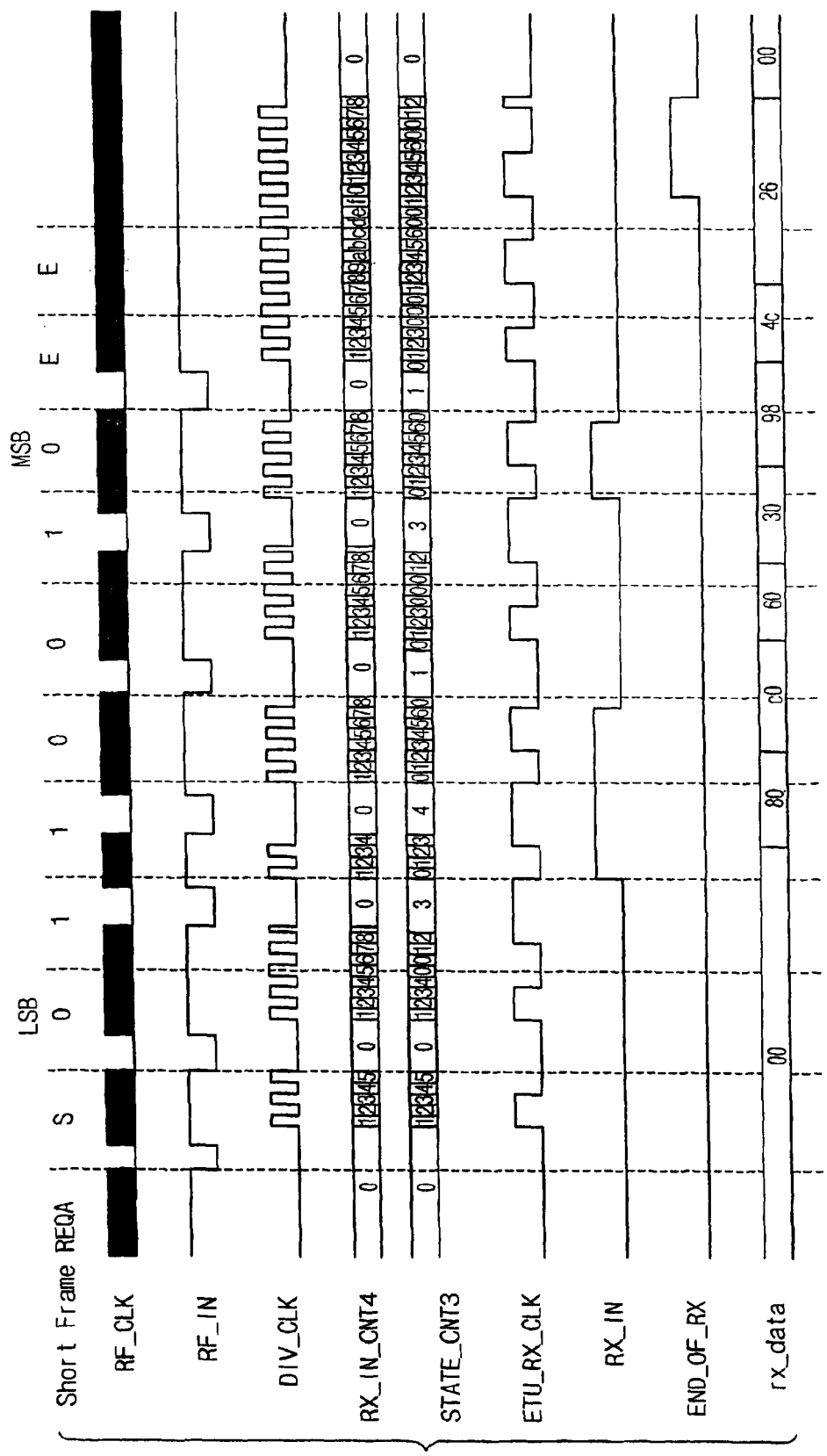
FIG. 8 is a timing diagram of the operation of various signals of the circuit shown in FIG. 7.

FIG. 8 is a timing diagram illustrating the response and operation of the circuit 200 of FIG. 6, receiving a short frame signal to be used for initializing a communicating condition.

Referring to FIGS. 7 and 8, the counter 24 and the clock generating and decoding circuit 260 are reset by a system reset signal SYS_RST prior to receiving a short frame signal from a card reader (not shown). The counter 250 is also reset in response to the clear signal CLEAR from the clock generation and decoding circuit 260, which causes initial outputs of the counters 240 and 250 to become zero. Meanwhile, the RF block 210 outputs the data signal RF_IN at a high level. If a first bit is introduced thereto during period S, the data signal RF_IN generated by the RF block 210 transitions from a high level to a low level. At this time, the clock divider 220 commences a frequency dividing operation. The cycle time of the divided clock signal DIV_CLK supplied by the clock divider 220 is ¼ ETU.

Following reset, the counters 240 and 250 conduct count-up operations at every rising and falling edge of the divided clock signal DIV_CLK. The clock generating and decoding circuit 260 receives the outputs from the counters 240 and 250 and then establishes rising and falling edges of the synchronous clock signal ETU_RX_CLK when the count outputs RX_IN_CNT4, STATE_CNT3 become specific predetermined values. The output patterns of the synchronous clock signal ETU_RX_CLK generated by the circuit 260 in response to the outputs RX_IN_CNT4, STATE_CNT3 of the counters 240 and 250 are summarized in the following Table 4.

TABLE 4

| ETU_RX_CLK | RX_IN_CNT4 [3] [2] [1] [0] | STATE_CNT3 [2] [1] [0] | Hex Code RX_IN_CNT4[3:0] 11 STATE_CNT3[2:0] |
|---|---|---|---|
| Rising Clock | 0 0 0 0 | 0 1 0 | 02 |
| | 0 0 0 1 | 0 0 1 | 11 |
| | 0 1 0 0 | 0 1 1 | 43 |
| | 1 0 0 0 | 0 1 0 | 82 |
| | 1 1 0 0 | 0 1 0 | C2 |
| Falling Clock | 0 0 0 0 | 0 0 0 | 00 |
| | 0 0 0 1 | 1 0 0 | 14 |
| | 0 0 0 1 | 1 0 1 | 15 |
| | 0 0 0 1 | 1 1 0 | 16 |
| | 0 0 0 1 | 1 1 1 | 17 |
| | 0 1 0 0 | 1 0 0 | 44 |
| | 0 1 0 0 | 1 1 0 | 46 |
| | 0 1 0 1 | 0 0 1 | 51 |
| | 0 1 1 0 | 0 0 1 | 61 |
| | 1 0 0 0 | 1 1 1 | 87 |
| | 1 0 0 1 | 0 0 1 | 91 |
| | 1 0 1 0 | 0 0 1 | A1 |
| | 1 1 0 0 | 1 1 0 | C6 |
| | 1 1 0 1 | 0 0 1 | D1 |
| | 1 1 1 0 | 0 0 1 | E1 |

For example, when the output RX_IN_CNT4 of the 4-bit counter 240 is 1 and the output STATE_CNT3 of the 3-bit counter 250 is 1, a rising edge of the synchronous clock signal ETU_RX_CLK is established. If the output RX_IN_CNT4 of the counter 240 is 4 and the output STATE_CNT3 of the counter 250 is 4, a falling edge of the synchronous clock signal ETU_RX_CLK is established. Thereby, this scenario results in the synchronous clock signal ETU_RX_CLK being produced at a data rate of 106 Kbps.

The synchronous clock signal ETU_RX_CLK composed in response to combinations of the output values of the 4-bit and 3-bit counters 240 and 250 is, for example, generated by means of logical combination circuits formed in the clock generating and decoding circuit 260.

The clock generating and decoding circuit 260 generates the data signal RX_IN according to the outputs RX_IN_CNT4 and STATE_CNT3 of the counters 240 and 250 in response to the falling edge of the synchronous clock signal ETU_RX_CLK.

The data signal RF_IN, as the modified miller code, becomes 0 logically when the count output is 0111 or 1111 during one ETU. Table 5 summarizes the case of establishing the decoded data signal RX_IN to a logic level of 1, in response to the to the outputs of the counters 140 and 150 at the falling edge of the synchronous clock signal ETU_RX_

CLK. When the outputs of the counters 240 and 250 are other than those indicated in Table 5, the data signal RX_IN is set to logic 0.

TABLE 5

| Signal & RF_IN | RX_IN_CNT4 | | | | STATE_CNT3 | | | Hex Code RX_IN_CNT4[3:0] 11 |
|---|---|---|---|---|---|---|---|---|
| Level | [3] | [2] | [1] | [0] | [2] | [1] | [0] | STATE_CNT3[2:0] |
| RX_IN 1101 | 0 | 0 | 0 | 0 | 0 | 1 | 1 | 03 |
| Logic 1 (1 ETU) | 0 | 0 | 0 | 0 | 1 | 0 | 0 | 04 |
| | 0 | 0 | 0 | 0 | 1 | 0 | 1 | 05 |
| | 0 | 0 | 0 | 0 | 1 | 1 | 0 | 06 |
| | 0 | 0 | 0 | 1 | 1 | 0 | 0 | 14 |
| | 0 | 0 | 0 | 1 | 1 | 0 | 1 | 15 |
| | 0 | 0 | 0 | 1 | 1 | 1 | 0 | 16 |
| | 0 | 0 | 0 | 1 | 1 | 1 | 1 | 17 |

For example, as shown in FIG. 8, if, at the falling edge of the synchronous clock signal ETU_RX_CLK, the output RX_IN_CNT4 of the 4-bit counter 240 is 0 and the output STATE_CNT3 of the 3-bit counter 250 is 3, the clock generating and decoding circuit 260 outputs the data signal RX_IN at logic 1. If, on the other hand, at the falling edge of the synchronous clock signal ETU_RX_CLK, the output RX_IN_CNT4 of the 4-bit counter 240 is 1 and the output STATE_CNT3 of the counter 250 is 3, the clock generating and decoding circuit 260 outputs the data signal RX_IN of logic 0. In this manner, an input data signal RF_IN of "0111 1101 1101 1111 0111 1101" is converted to the decoded data signal RX_IN of "011001". The binary "011001" corresponds to the decimal "26".

The following table 6 shows a code arrangement in the clock generating and decoding circuit 260 for generating the clear signal CLEAR to reset the counter 260.

TABLE 6

| | RX_IN_CNT | | | | STATE_CNT | | | Hex Code RX_IN_CNT[3:0] 11 |
|---|---|---|---|---|---|---|---|---|
| CLEAR | [3] | [2] | [1] | [0] | [2] | [1] | [0] | STATE_CNT3[2:0] |
| NOT CLEAR | 0 | 0 | 0 | 0 | 0 | 0 | 0 | 00 |
| CLEAR | x | x | x | x | x | x | x | Other case |
| CLEAR | 0 | 0 | 0 | 0 | 0 | 0 | 1 | 01 |
| | 0 | 0 | 0 | 1 | 1 | 0 | 0 | 14 |
| | 0 | 0 | 0 | 1 | 1 | 0 | 1 | 15 |
| | 0 | 0 | 0 | 1 | 1 | 1 | 0 | 16 |
| | 0 | 0 | 0 | 1 | 1 | 1 | 1 | 17 |
| | 0 | 1 | 0 | 0 | 1 | 0 | 0 | 44 |
| | 0 | 1 | 0 | 0 | 1 | 1 | 0 | 46 |
| | 0 | 1 | 0 | 1 | 0 | 0 | 1 | 51 |
| | 0 | 1 | 1 | 0 | 0 | 0 | 1 | 61 |
| | 1 | 0 | 0 | 0 | 1 | 1 | 1 | 87 |
| | 1 | 0 | 0 | 1 | 0 | 0 | 1 | 91 |
| | 1 | 0 | 1 | 0 | 0 | 0 | 1 | A1 |
| | 1 | 1 | 0 | 0 | 1 | 1 | 0 | C6 |
| | 1 | 1 | 0 | 1 | 0 | 0 | 1 | D1 |
| | 1 | 1 | 1 | 0 | 0 | 0 | 1 | E1 |

As shown in Table 6, the 3-bit counter 250 is reset in response to certain logical combinations of the outputs RX_IN_CNT4, STATE_CNT3 of the counters 240 and 250.

The code arrangement for identifying an end bit E that denotes the termination of a frame is as follows. The clock generating and decoding circuit 260 generates an end signal END_OF_RX in accordance with the outputs of the counters 240 and 250, as shown in the following Table 7.

TABLE 7

| Signal & RF_IN Level | RX_IN_CNT4 | | | | STATE_CNT3 | | | Hex Code RX_IN_CNT4[3:0] 11 STATE_CNT3[2:0] |
|---|---|---|---|---|---|---|---|---|
| | [3] | [2] | [1] | [0] | [2] | [1] | [0] | |
| END_OF_RX 11111111 (2 ETU) | 1 | 1 | 0 | 1 | 1 | 1 | 0 | D6 |
| | 1 | 1 | 1 | 1 | 0 | 0 | 1 | F1 |
| | 1 | 1 | 1 | 1 | 1 | 0 | 1 | F5 |

According to the embodiments of the invention described above, the clock generating and data restoring circuit 200 generates the synchronous clock signal ETU_RX_CLK at a rate of 0.11 MHz and the decoded data signal RX_IN, which makes it available to receive data according to the ISO/IEC 14443 A-type protocol.

The pause period for one-bit data is eight clock cycles when the data rate is 106 Kbps and one-bit data appears during 32 cycles of the clock signal RF_CLK. The circuit 100 shown in FIG. 4 may restore an exact signal if the pause period is within the range of six to eleven clock cycles. While the 6~11 clock cycles corresponds to 1.764~3.234 $\mu$s, the pause period of the clock signal RF_CLK is substantially 0.294~4.704 $\mu$s while operating in a practical operating condition. The clock generating and data restoring circuit is 200 shown in FIG. 6 includes a 4-bit counter 240 a 3-bit counter 250, and therefore can track variations in the pause period. The circuit 200 of FIG. 6 permits the pause period to be variable, over a range of 0.884~4.129 $\mu$s. It is also possible to permit the pause period of 0.589~2.604 $\mu$s for a data rate of 212 Kbps or a pause period of 0.294~0.884 $\mu$s for a data rate of 424 Kbps.

As described above, a contactless IC card generates a synchronous clock signal from an RF signal received from a card reader, which is adaptable to an ISO/IEC 14443 A-type protocol, and decodes the received data signal. Moreover, it is possible to obtain an exact decoding result, even when the pause period of the RF signal varies over a predetermined range.

While this invention has been particularly shown and described with references to preferred embodiments thereof, it will be understood by those skilled in the art that various changes in form and detail may be made herein without departing from the spirit and scope of the invention as defined by the appended claims.

What is claimed is:

1. A device for generating a clock signal and decoding data for use in a contactless integrated circuit device comprising:
    a receiver for receiving a radio frequency (RF) signal having a pause period;
    a divider for dividing the received RF signal to provide a divided signal;
    a first counter for counting a period of the divided signal at each non-pause period of the received RF signal;
    a second counter for counting a period of the divided signal; and
    a decoder for generating a synchronous clock signal and a decoded data signal in response to outputs of the first and second counters.

2. The device according to claim 1, wherein the first counter is reset during the pause period of the RF signal.

3. The device according to claim 1, wherein the second counter is reset at a falling edge of the synchronous clock signal.

4. The device according to claim 1, wherein the RF signal is based on an ISO-14443 Type A interface.

5. The device according to claim 4, wherein the decoder further generates a signal indicating an end of a received frame in response to the outputs of the first and second counters.

6. The device according to claim 1, wherein the first counter is a 4-bit counter.

7. The device according to claim 1, wherein the second counter is reset by a combination of the outputs of the first and second counters.

8. The device according to claim 1, wherein the second counter is a 3-bit counter.

9. The device according to claim 1, wherein the second counter is reset in response to a clear signal from the decoder.

10. A data restoring device for use in a contactless integrated circuit card comprising:
   a receiver for receiving an RF signal having a pause period and extracting data and clock signals from the received RF signal;
   a divider for dividing the clock signal to generate a divided clock signal;
   a first counter for counting a period of the divided clock signal at each non-pause period of the data signal;
   a second counter for counting a period of the divided clock signal; and
   a decoder for generating a synchronous clock signal and a decoded data signal in response to outputs of the first and second counters.

11. The device according to claim 10, wherein the first counter is reset at a start of the pause period of the data signal.

12. The device according to claim 11, wherein the first counter is a 3-bit counter.

13. The device according to claim 10, wherein the second counter is reset in response to the synchronous clock signal.

14. The device according to claim 13, wherein the second counter is a 2-bit counter.

15. The device according to claim 10, wherein the second counter is reset at a falling edge of the synchronous clock signal.

16. The device according to claim 15, wherein an output of the second counter sequentially varies between '0' and '2'.

17. The device according to claim 10, wherein the first counter is a 4-bit counter.

18. The device according to claim 17, wherein the second counter is reset by a combination of the outputs of the first and second counters.

19. The device according to claim 10, wherein the second counter is a 3-bit counter.

20. The device according to claim 10, wherein the RF signal is based on an ISO-14443 A-Type interface.

21. The device according to claim 20, wherein the decoder further generates a signal indicating an end of a received frame in response to the outputs of the first and second counters.

22. The device according to claim 10, further comprising an OR gate for receiving a reset signal for resetting the card and the data signal, wherein the first counter is reset by an output of the OR gate.

23. The device according to claim 10, wherein the divider includes:
   a plurality of division units connected in series between an input terminal and an output terminal, wherein the input terminal receives the clock signal from the receiver and each division unit divides an input signal by N (N is an integer); and
   a selector for selecting one of outputs of the division units in response to an external selection signal, as the divided clock signal.

24. The device according to claim 10, wherein the second counter is reset in response to a clear signal from the decoder.

25. A device for generating a clock signal and decoding data for use in a contactless integrated circuit device comprising:
   a receiver for receiving a radio frequency (RF) signal having a pause period;
   a divider for dividing the received RF signal to provide a divided signal;
   a 4-bit counter for counting a period of the divided signal at each non-pause period of the received RF signal;
   a 3-bit counter for counting a period of the divided signal; and
   a decoder for generating a synchronous clock signal and a decoded data signal in response to a combination of outputs of the 4-bit counter and the 3-bit counter.

26. The device according to claim 25, wherein the 4-bit counter is reset during the pause period of the RF signal.

27. The device according to claim 25, wherein the RF signal is based on an ISO-14443 Type A interface.

28. The device according to claim 25, wherein the 3-bit counter is reset in response to a clear signal from the decoder that is generated as the combination of the outputs of the 4-bit counter and the 3-bit counter.

29. The device according to claim 25, wherein the decoder further generates a frame termination signal indicating an end of a received frame in response to a combination of the outputs of the 4-bit counter and the 3-bit counter.

* * * * *